March 21, 1961  R. ZOGLMANN ET AL  2,975,691
DEVICE FOR THE SUPPLY AND REMOVAL OF FILM IN MIRROR CAMERAS
Filed Jan. 26, 1959  2 Sheets-Sheet 1
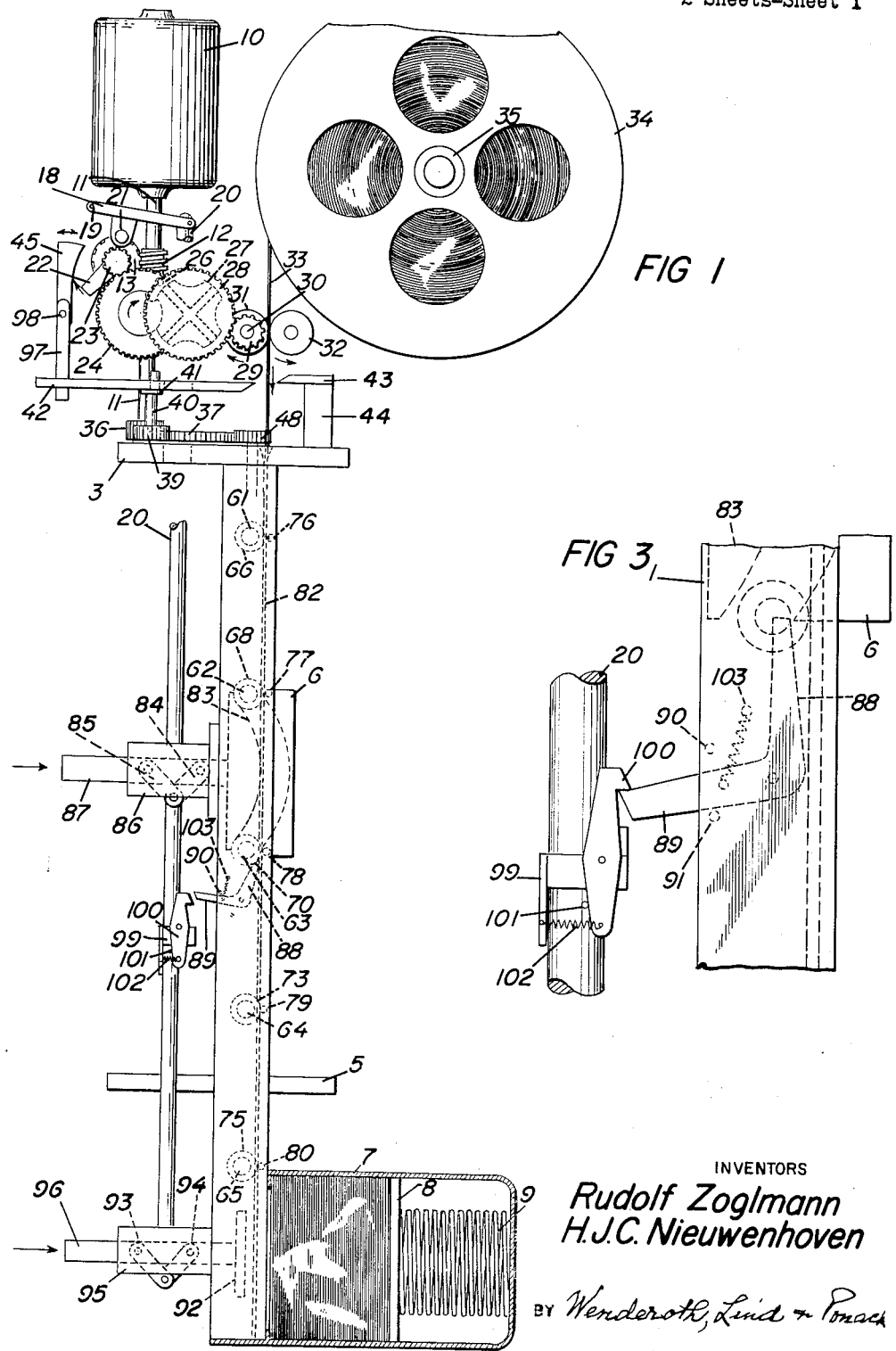
INVENTORS
Rudolf Zoglmann
H.J.C. Nieuwenhoven
BY Wenderoth, Lind & Ponack
ATTORNEYS March 21, 1961   R. ZOGLMANN ET AL   2,975,691
DEVICE FOR THE SUPPLY AND REMOVAL OF FILM IN MIRROR CAMERAS
Filed Jan. 26, 1959   2 Sheets-Sheet 2
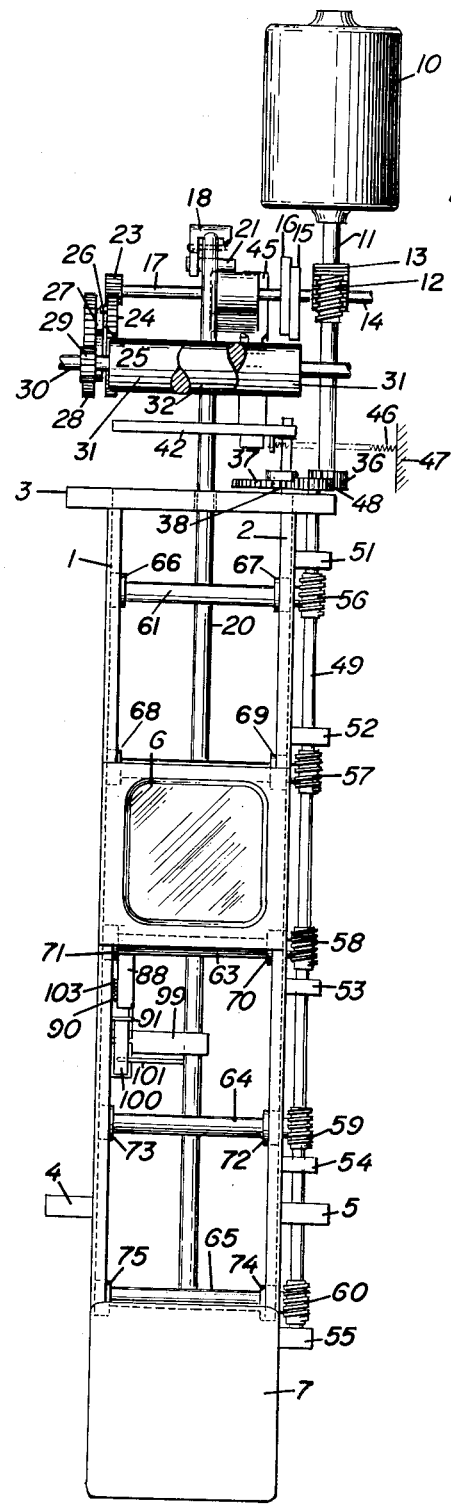
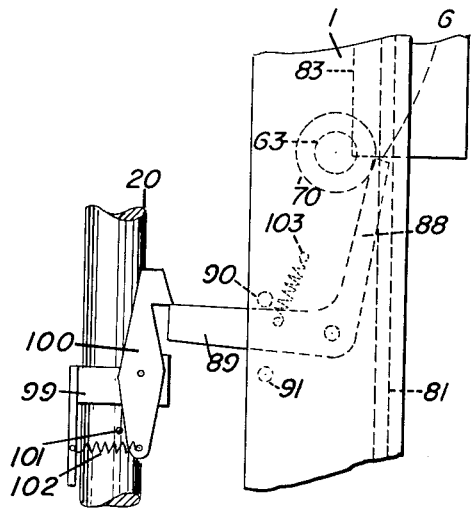
INVENTORS
Rudolf Zoglmann
H.J.C. Nieuwenhoven
BY Wenderoth, Lind & Ponack
ATTORNEYS United States Patent Office 2,975,691
Patented Mar. 21, 1961

2,975,691

DEVICE FOR THE SUPPLY AND REMOVAL OF FILM IN MIRROR CAMERAS

Rudolf Zoglmann, Delft, and Hendricus Jacobus Cornelis Nieuwenhoven, Rijswijk, Netherlands, assignors to N.V. Optische Industrie De Oude Delft, Delft, Netherlands Filed Jan. 26, 1959, Ser. No. 789,091

Claims priority, application Netherlands Nov. 3, 1954

7 Claims. (Cl. 95—31)

This application is a continuation-in-part of our application Ser. No. 542,454, filed October 24, 1955, entitled "Device for the Supply and Removal of Film in Mirror Cameras," now abandoned.

The invention relates to a device for the supply and removal of film in mirror cameras. Devices of this kind are already disclosed, e.g. in the Netherlands patent specifications 75,081 and 75,024, in which are set forth the advantages of using individual cut films instead of roll films in mirror cameras.

However, with these disclosed devices it is not possible to take a large number of pictures in rapid succession, which is a necessity for various application of the camera. For instance, in cameras for indirect radiography which it is desired to use for funtcional X-ray diagnostics, arteriography or angiography, an exposure frequency of from 2 to 10 pictures per second is often required.

Along with the demand for a high exposure frequency, it is also very important to be able to use the camera in many different positions. This means that the use of gravity, as described, for instance, in the Netherlands patent specification 75,024, is not possible in this case.

Accordingly, it is a first object of the present invention to provide a device of the type referred to which permits, in addition to the taking of single shots, series of pictures in rapid succession to be made in a mirror camera. Another object is to provide such a device which, in operation, does not depend on the force of gravity and, consequently, may be used in different positions.

According to the invention these two objects are achieved by that in a device for the supply and removal of individual cut films in mirror cameras, means are provided for moving these films one at a time into the first portion of a guide in the camera housing, in which guide the films are transferred by means of rollers to the window-frame and, after the usual pressing into position, exposure and release, are again conveyed by means of rollers through the second portion of the guide and hence passed out of the camera housing.

The device according to the invention may, with advantage, be constructed in such a way that the individual unexposed films are cut from a film band mounted on a feed spool outside the camera, the requisite cutting device being coupled to the device which effects the pressing into position and subsequent release of the individual films.

In this way the problem of taking individual, unexposed films from a film pack at high speed is entirely avoided.

It is recommendable, according to the invention, to construct the device in such a way that the conveyance rollers run continuously during the pressing into position, exposure and subsequent release of the film, means being provided whereby the unexposed films are stopped on arrival at the window-frame and are again released after exposure has been effected so that the conveyance of the films by the rollers is again continued. In this way a simple and very reliable system of conveyance is produced which readily permits film supply at speeds of 10 or even more films per second. The unexposed films are, as it were, "shot" towards the window-frame, whilst the exposed films are similarly "shot" into the take-up magazine.

The distance between the motor-driven conveyance rollers should preferably be less than the length of a piece of film as required for a single picture. In this way the advantage will be gained that there is never any possibility of a film remaining positioned in between two sets of rollers.

Another advantageous construction is obtained if the cutting-off of the piece of film is effected by means of a cutter which, by a vibratory movement derived from the conveyance mechanism, is rapidly passed through the film on to a counter-cutter. In this way the cutting-off, which has to be done very quickly, is greatly facilitated.

Details of the invention will be more fully explained hereinafter by reference to the drawings which depict, by way of example, an embodiment of the film conveying device constructed in accordance with the invention and in which:

Fig. 1 is a cross-sectional view of the film conveying device along a plane intersecting the film take-up magazine.

Fig. 2 represents a view of the same conveying device as seen from the right of Fig. 1.

Fig. 3 is an enlarged view of a detail in Figure 1 showing the stop lever in retracted position, and Fig. 4 is a similar view showing the stop lever in operative position.

The device illustrated comprises a frame formed by parallel guides 1 and 2 with plate 3 and strips 4 and 5. This plate, together with the strips, serves as a support for the device in the wall of the camera housing. The device furthermore comprises a window frame 6 and a film take-up magazine 7 with a movable bottom 8 and a spring 9.

A motor 10, acting via spindle 11 with endless screw 12 and worm wheel 13, drives a spindle 14. Mounted on this spindle is a portion of an eccentric coupling 15, which is in gear with the other portion 16 on a spindle 17. A lever 18 rotatable about a spindle 19 and connected to a rod 20, carries a roller 21 which is actuated by a cam 22 on the spindle 17. Rigidly mounted on this spindle 17 is a toothed wheel 23 which is in mesh with a toothed wheel 24 having a disk 25 and a pin 26 fixed to it. The disk and pin cooperate with the Maltese cross 27, which is mounted on a spindle not shown in the drawing, and is rigidly connected to the toothed wheel 28 which is in mesh with a pinion 29 on a spindle 30 which also carries a roller 31. The latter cooperates with the counter-roller 32 for conveying the end of the film 33 which is unwound from the feed spool 34 supported on a spindle 35 the latter being situated outside the camera housing. Rigidly mounted at the end of spindle 11, which is driven by the motor 10, is a toothed wheel 36 which is in mesh with an intermediate wheel 37 on spindle 38 supported on the plate 3. The toothed wheel 39 on spindle 40 is in mesh with the intermediate wheel 37. Spindle 40, also supported on plate 3, rotates an eccentric 41 within a movably positioned cutter blade 42. A counter-cutter 43 is fixedly mounted on plate 3 via a support 44. See Figures 1 and 4. The motion of the cutter 42 in the directions of the arrows shown on the left is derived from an arm 97 mounted on a spindle 98 together with cam 45, which is actuated by the cam 22 (shown in a shifted position in the drawing) on spindle 17. The cutter 42 is urged to follow the vibration by a spring 46 which is shown diagrammatically in the drawing (Fig. 2), as being connected to fixed point 47. Engaged with the intermediate wheel 37 is a toothed wheel 48 rigidly mounted on a spindle 49 which rotates in bearings 50, 51, 52, 53, 54 and 55 on guide 1. Rigidly mounted on spindle 49 are toothed wheels 56, 57, 58, 59 and 60 which, as parts of 90° transmission gears, drive the spindles 61, 62, 63, 64 and 65 fixedly carrying the driving rollers 66, 67, 68, 69, 70, 71, 72, 73, 74 and 75. Rotatably mounted on guides 1 and 2 are counter-rollers 76, 77, 78, 79 and 80. The pairs of rollers and counter-rollers serve as the means for conveying the individual pieces of cut film in the grooves 81 and 82 of guides 1 and 2.

Rod 20 connected to lever 18 actuates the appliances for the pressing plate 83 and a stop device which is shown on an enlarged scale in Figures 3 and 4.

The stop device comprises the lever 88, 89 mounted on guide 1 and rotatable anti-clockwise against the tension of spring 103 by means of a rotatable lever 100 carried by a member 99 which is fixedly mounted on rod 20. Pins 90 and 91 are stops limiting the movement of the lever 88, 89 whose arm 88 projects into the path of the film when arm 89 is held drawn against stop pin 90. Lever 100 in its normal or rest position is drawn against a stop pin 101 by a spring 102.

On the other hand, rod 20 actuates the appliances for the film pushing plate 92 of take-up magazine 7, to wit the toggle joint levers 93 and 94, bush 95 and spindle 96.

The operation of the device is as follows. When motor 10 is started it propells via spindle 11, endless screw 12, worm wheel 13, spindle 14 and toothed wheels 28 and 29, the roller 31 (which makes one revolution) and the leading end of the films 33 is fed by rollers 31 and 32 over a length of about one piece of cut film into the grooves 81 and 82 in the camera housing. Roller 31 is blocked by the disk 25 on the Maltese cross 27. Spindle 11 with toothed wheel 36, acting via toothed wheels 37 and 48, spindle 49, toothed wheel 56 and spindle 61, drives rollers 66 and 67. The latter are held slipping on the film which is passed between them and the respective counter-rollers but are unable (on account of their small diameter) to pull the film through against the resistance of the blocked roller 31 with pressure roller 32. In the meantime cam 22 on spindle 17 has engaged lever 45 on spindle 98, as a result of which the cutter 42 by the movement of the arm 97, is pushed towards the film. In the course of this operation, a to-and-fro vibratory movement is imparted to the cutter 42 by the eccentric 41 which movement is in a direction perpendicular to the plane of Fig. 1 of the drawing. The cutter whose edge is ground to a slightly hollow shape approaches the film on either side in such a way, that, on coming into contact with the film, it encounters but little resistance and makes initial cuts at the edges of the film. In the further course of the cutting action, the piece of film to be exposed is severed from the film at a point approximately in the middle of its width. At this moment the piece of film does not encounted any further resistance and, being propelled by the driven pairs of rollers 66, 67 and 68, 69, it is conveyed at a high speed along the guides until it is stopped in front of the window frame 6 by the lever 88, 89 of the stop device.

Then cam 22, acting via roller 21 and lever 18, moves rod 20 upward from the position illustrated in Fig. 1, as a result of which the pressing plate 83 on spindle 87 in bush 86, acting through the agency of the toggle joint levers 84 and 85, presses the piece of film into the correct curvature against the window frame 6. In the meantime the cutter, after having severed the film, has, under the action of spring 46, jumped back to the starting position, as a result of cam 22 having slipped off lever 45. The mechanism of the Maltese cross approaches the initial position for re-supply of a piece of film in the manner described above.

On the reciprocating rod 20 a member 99 (Figs. 3 and 4) is fixedly mounted. This member carries a rotatable lever 100 which is normally held against a stop pin 101 by a spring 102. Lever 100 cooperates with arm 89 of lever 88, 89 so as to rotate the latter anti-clockwise against the tension of a spring 103 which normally holds lever arm 89 against stop 90. As stated before, the film has been stopped by lever arm 88 and is pressed against the frame 6 by pressure plate 83. Upon completion of the exposure rod 20 is retracted toward the position shown in Fig. 1 through the agency of cam 22 and, consequently, plate 83 is moved to the left by toggle joint levers 84, 85, thus releasing the film for further conveyance. When rod 20 is retracted the nose of lever 100 engages lever 88, 89 and rotates the latter until it is stopped by pin 91. See Fig. 3. Then lever 100 is rotated through a small angle in anti-clockwise direction by contact with arm 89 and its nose passes along lever arm 89 whereby lever 88, 89 is allowed to retake its original position, as shown in Fig. 4. Thus, arm 88 of lever 88, 89 has been momentarily lifted out of the path of the exposed film so as to allow the latter to be "shot" by the rollers 70, 71 towards the take-up magazine 7. The rollers 70, 71 and the associated pressure rollers which, preferably, may have been temporarily put out of action by the pressure plate, and moved back into their positions when the pressure plate is retracted, accelerate the piece of film. By cooperation of the further sets of rollers 72, 73 and 74, 75 the film finally is led out of the camera housing. At the end of its course, it stays in the grooves 81 and 82 of guides 1 and 2 until, under control of the cam 22 and in a manner analogous to the pressure 83, it is pushed into the take-up magazine 7 by plate 92, through the agency of toggle joint levers 93, 94 and spindle 96 in bush 95. When plate 92 is moved back, the stack of exposed cut films in the take-up magazine is pressed by spring 9 and the loose bottom plate 8 against a pair of narow edges of magazine 7. These edges are at a distance from each other slightly smaller than the width of the cut films.

At the same time the exposed film is shot towards the take-up magazine, the next film to be exposed is fed towards the exposure position and, upon arrival of this film, rod 20 is lifted again, whereby the situation of Fig. 3 is restored. It will be noted that the nose of lever 100 is free to slip past arm 89 by a slight rotation of lever 100.

It will be obvious that in a camera equipped with the device described above, a large number of pictures can be taken in a short time. As the film speed can be very high it is readily conceivable that the distance between the first set of rollers 66, 67 and the next set of rollers 68, 69 may be much larger than the width of the cut films, and that, in some cases, the sets of rollers 66, 67 and 70, 71 may be sufficient to "shoot" the films towards the window frame and the take-up magazine respectively, all of the rollers 68, 69, 72, 73, 74, 75 being omitted.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

We claim:

1. A device for the supply and removal of individual films in mirror cameras comprising a camera housing, a guide for said films fixed to said housing, a window frame mounted upon said guide in which individual films are to be exposed, means for moving said films into said camera housing one at a time into a first portion of said guide, rollers mounted upon said guide for transferring said films in said first portion of said guide to said window frame, means for pressing the individual film in said window frame into position for exposure, means for releasing said film in said window frame from said pressing means, and a second series of rollers upon a second portion of said guide for transferring said exposed films away from said window frame after exposure.

2. A device as set forth in claim 1 wherein a feed spool is mounted outside of said camera containing a roll of film and cutting means are provided operating in synchronism with said pressing means for cutting said roll of film into individual films.

3. A device as set forth in claim 1 wherein said rollers for transferring said films are operated continuously during the operation of said pressing means and means are provided for stopping unexposed films upon arrival at said window frame.

4. A device as set forth in claim 1 wherein said transferring rollers are spaced from one another less than the length of an individual film.

5. A device as set forth in claim 2 wherein said cutting means are operated by said means for moving said films individually into said camera housing.

6. A device for the supply and removal of individual films in mirror cameras comprising a camera housing, a pair of parallel guides extending through said housing having a first portion and a second portion, means for supplying cut films individually from a film supply to said first portion of said parallel guides, a window frame mounted upon said guides between said first and second portions, a plurality of motor-driven rollers mounted upon said first portion of said parallel guides to engage the edges of said individual films when passing through said guides and to convey said films to said window frame, stop means to stop said films temporarily for the exposure thereof upon arrival at said window frame, means for pressing said films against said window frame into position for exposure thereof and for releasing said films after exposure and a plurality of motor-driven rollers mounted upon said second portion of said parallel guides to engage the edges of said films when passing through said second portion to convey said films away from said camera housing.

7. A device as set forth in claim 6 wherein said motor-driven rollers are mounted on shafts extending between said parallel guides and a counted roller is provided for each of said motor-driven rollers so positioned that said films pass between said motor-driven rollers and said counter rollers and a common driving means for said shafts.

References Cited in the file of this patent
UNITED STATES PATENTS

| | | |
|---|---|---|
| 2,287,271 | Powers | June 23, 1942 |
| 2,474,159 | Pejois | June 21, 1949 |

FOREIGN PATENTS

| | | |
|---|---|---|
| 591,303 | Germany | Jan. 19, 1934 |
| 553,688 | Great Britain | June 1, 1943 |
| 732,402 | Great Britain | June 22, 1955 |